(12) United States Patent
Yamanashi

(10) Patent No.: US 12,539,918 B2
(45) Date of Patent: Feb. 3, 2026

(54) BRACKET FOR FIXING ONBOARD ARTICLE

(71) Applicant: Isuzu Motors Limited, Yokohama (JP)

(72) Inventor: Daiki Yamanashi, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 235 days.

(21) Appl. No.: 18/028,806

(22) PCT Filed: Sep. 15, 2021

(86) PCT No.: PCT/JP2021/033846
§ 371 (c)(1),
(2) Date: Mar. 28, 2023

(87) PCT Pub. No.: WO2022/070906
PCT Pub. Date: Apr. 7, 2022

(65) Prior Publication Data
US 2023/0331303 A1    Oct. 19, 2023

(30) Foreign Application Priority Data

Sep. 30, 2020    (JP) .................................. 2020-165203

(51) Int. Cl.
*B62D 21/02* (2006.01)
*B60K 1/04* (2019.01)

(52) U.S. Cl.
CPC ............... *B62D 21/02* (2013.01); *B60K 1/04* (2013.01); *B60K 2001/0416* (2013.01)

(58) Field of Classification Search
CPC ........ B62D 21/02; B62D 27/065; B60K 1/04; B60K 2001/0416

USPC ........................................................ 180/68.5
See application file for complete search history.

(56) References Cited

U.S. PATENT DOCUMENTS

| | | | | |
|---|---|---|---|---|
| 4,317,497 | A * | 3/1982 | Alt | H01M 50/209 |
| | | | | 180/68.5 |
| 8,562,036 | B2 * | 10/2013 | Zhou | H01M 50/209 |
| | | | | 429/96 |
| 9,301,408 | B2 * | 3/2016 | Conrardy | H05K 5/00 |
| 9,755,200 | B2 * | 9/2017 | Conrardy | H01M 50/298 |
| 10,857,869 | B2 * | 12/2020 | Wakebe | B60L 50/64 |
| 2006/0096794 | A1 | 5/2006 | Yoshida | |

(Continued)

FOREIGN PATENT DOCUMENTS

| | | |
|---|---|---|
| CN | 204978206 | 1/2016 |
| CN | 207466340 | 6/2018 |

(Continued)

*Primary Examiner* — Hau V Phan

(57) ABSTRACT

Provided is a bracket for fixing an onboard article capable of achieving an increase in strength. This bracket for fixing an onboard article comprises: first brackets each of which is formed into an L shape and includes a vehicle body mounting portion fixed to a vehicle body frame and a bottom surface fixing portion connected to a lower end of the vehicle body mounting portion, protruding toward the outside in the vehicle width direction, and fixing a bottom surface of an onboard article; and second brackets each of which has one end connected to an upper end of the vehicle body mounting portion, is installed so as to protrude toward the outside in the vehicle width direction, and has the other end fixed to the onboard article.

7 Claims, 2 Drawing Sheets

(56) References Cited

U.S. PATENT DOCUMENTS

| | | | |
|---|---|---|---|
| 2017/0237053 A1* | 8/2017 | Sugawara | H01M 50/204 |
| | | | 429/159 |
| 2018/0366701 A1* | 12/2018 | Morimitsu | H01M 10/0422 |
| 2018/0366703 A1 | 12/2018 | Izumi et al. | |
| 2019/0062112 A1* | 2/2019 | Gorzalczynski | B66B 5/18 |
| 2019/0366824 A1 | 12/2019 | Wakebe | |
| 2020/0029781 A1* | 1/2020 | Strahle | G05B 19/0426 |
| 2020/0169214 A1* | 5/2020 | Koch | H02S 30/10 |
| 2020/0215895 A1* | 7/2020 | Tanaka | B62D 27/065 |

FOREIGN PATENT DOCUMENTS

| | | |
|---|---|---|
| CN | 109099526 | 12/2018 |
| CN | 110370920 | 10/2019 |
| CN | 209776168 | 12/2019 |
| JP | 60-032559 | 3/1985 |
| JP | 08-48196 | 2/1996 |
| JP | 2001-193714 | 7/2001 |
| JP | 2006-123658 | 5/2006 |
| JP | 2006-240463 | 9/2006 |
| JP | 2007-230459 | 9/2007 |
| JP | 2014-000914 | 1/2014 |
| JP | 2014-148210 | 8/2014 |
| JP | 2019-209718 | 12/2019 |
| KR | 10-1645876 | 8/2016 |
| WO | WO 2017/104034 | 6/2017 |

\* cited by examiner

BRACKET FOR FIXING ONBOARD ARTICLE

TECHNICAL FIELD

The present disclosure relates to an on-board article fixing bracket used for fixing an on-board article.

BACKGROUND ART

In the related art, there is known an L-shaped bracket attached to a vehicle body frame (for example, a side frame) and serving for fixing an on-board article (for example, a battery) (see, for example, Patent Literature (hereinafter referred to as "PTL") 1). For example, a side of a bottom surface of the on-board article mounted on this L-shaped bracket is fixed by a stopper.

CITATION LIST

Patent Literature

PTL 1
Japanese Patent Application Laid-Open No. 2007-230459

SUMMARY OF INVENTION

Technical Problem

However, since a large load is applied to a bent portion of the L-shaped bracket in the related art, there is room for improvement in terms of strength.

An object of one aspect of the present disclosure is to provide an on-board article fixing bracket capable of achieving an increase in strength.

Solution to Problem

An on-board article fixing bracket according to an aspect of the present disclosure includes: a first bracket formed into an L shape; and a second bracket. The first bracket includes: a vehicle body attachment portion fixed to a vehicle body frame; and a bottom surface fixing portion which is connected to a lower end of the vehicle body attachment portion and protrudes outward in a vehicle width direction, and to which a bottom surface of an on-board article is fixed. The second bracket includes one end connected to an upper end of the vehicle body attachment portion, is provided so as to protrude outward in the vehicle width direction, and includes another end fixed to the on-board article.

An on-board article fixing bracket according to an aspect of the present disclosure is used together with an L-shaped bracket. The L-shaped bracket includes: a vehicle body attachment portion fixed to a vehicle body frame; and a bottom surface fixing portion which is connected to a lower end of the vehicle body attachment portion and protrudes outward in a vehicle width direction, and to which a bottom surface of an on-board article is fixed. The on-board article fixing bracket includes one end connected to an upper end of the vehicle body attachment portion, is provided so as to protrude outward in the vehicle width direction, and includes another end fixed to the on-board article.

Advantageous Effects of Invention

According to the present disclosure, it is possible to achieve an increase in strength.

DESCRIPTION OF EMBODIMENTS

Hereinafter, an embodiment of the present disclosure will be described with reference to the accompanying drawings.

Figure 1:
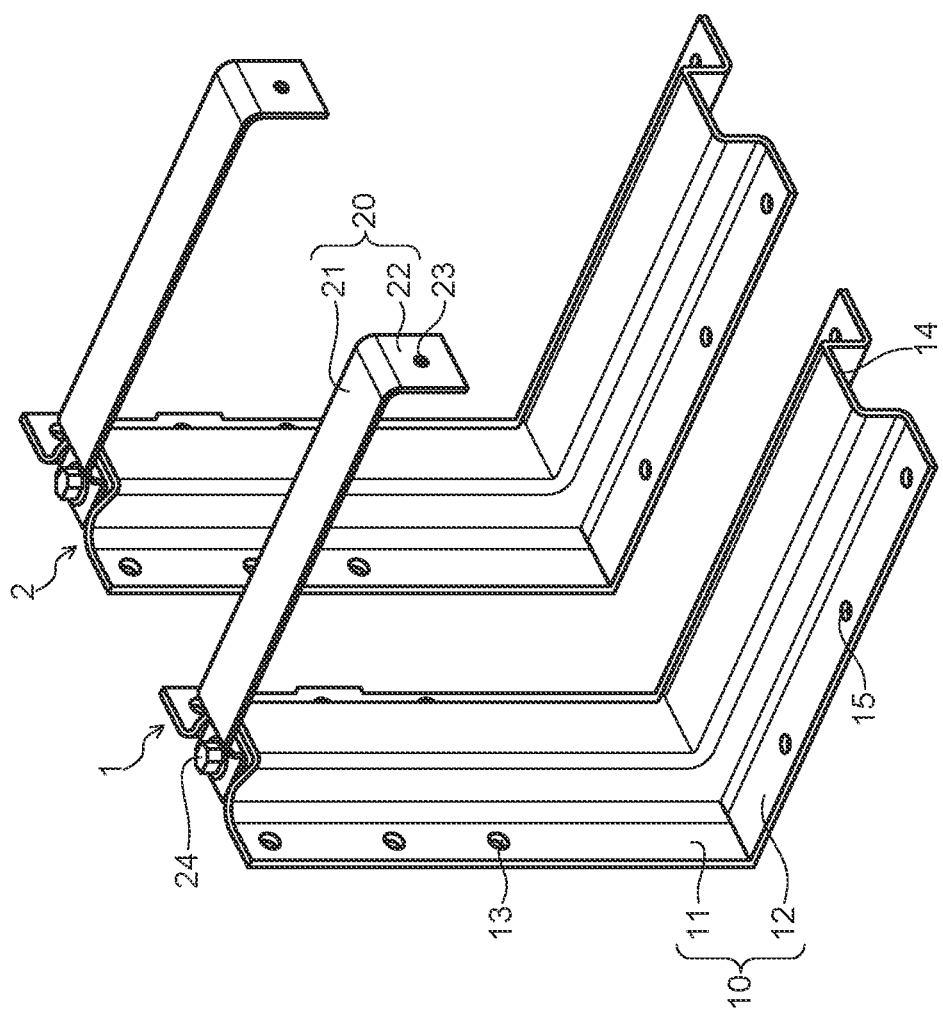
FIG. 1 is a perspective view illustrating an on-board article fixing bracket (in a state in which no battery is mounted) according to the present embodiment.
Figure 2:
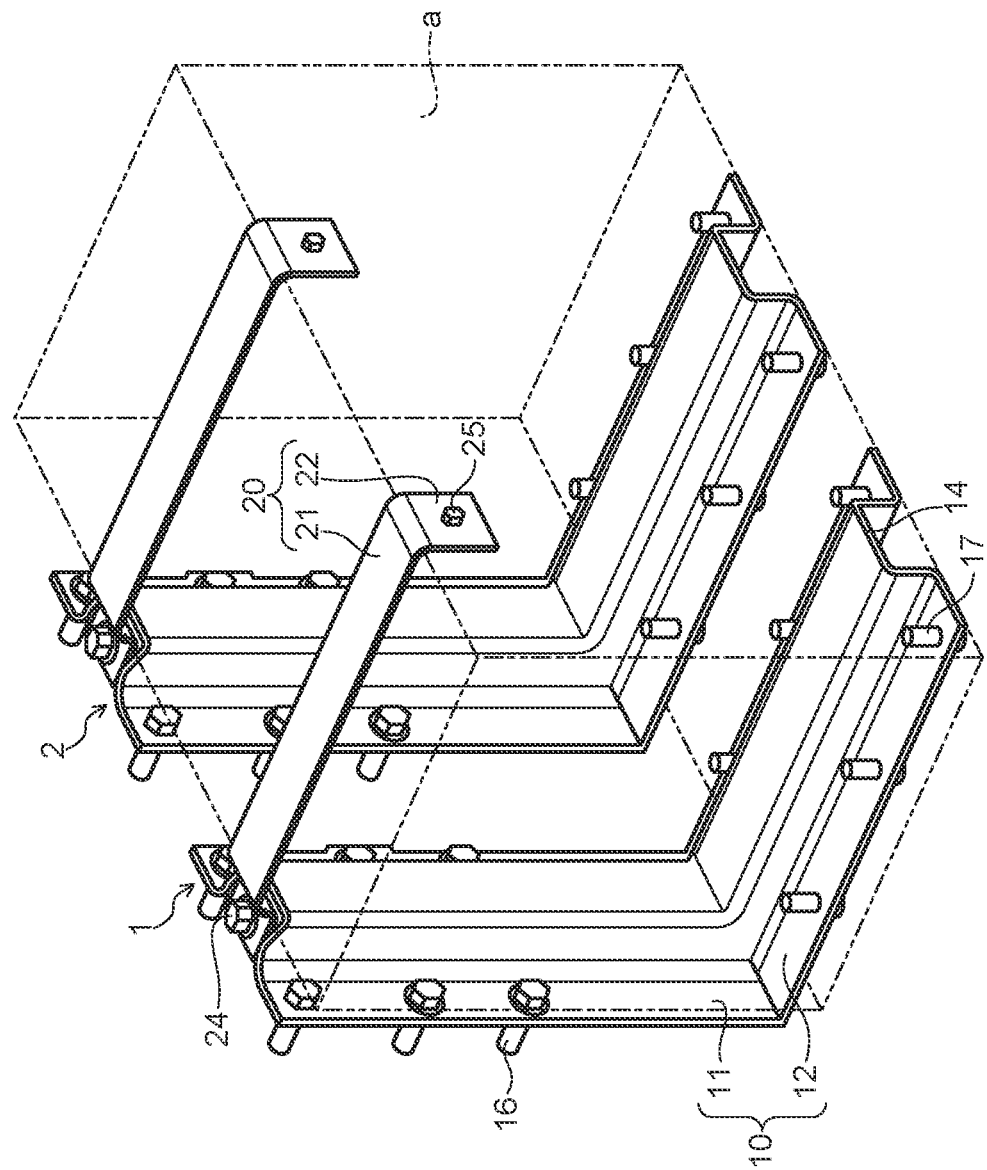
FIG. 2 is a perspective view illustrating the on-board article fixing bracket (in a state in which a battery is mounted) according to the present embodiment.

On-board article fixing bracket 1 of the present embodiment will be described by using FIGS. 1 and 2. FIGS. 1 and 2 are perspective views illustrating on-board article fixing bracket 1. FIG. 1 illustrates a state in which battery 2 is not attached to on-board article fixing bracket 1. FIG. 2 illustrates a state in which battery 200 is attached to on-board article fixing bracket 1.

Two on-board article fixing brackets 100 illustrated in FIGS. 1 and 2 are mounted on a vehicle (not illustrated) (for example, a commercial vehicle such as a truck and a bus). Note that, since two on-board article fixing brackets 1 that are illustrated are the same object, reference signs indicating various components are provided only for one of on-board article fixing brackets 1 in each drawing.

On-board article fixing bracket 1 is a bracket for fixing battery 200 (an example of the on-board article). On-board article fixing bracket 1 includes first bracket 10 and second bracket 20.

First bracket 10 is a bracket formed into an L shape. First bracket 10 includes vehicle body attachment portion 11 and bottom surface fixing portion 12.

As illustrated in FIG. 1, vehicle body attachment portion 11 is provided with a plurality of bolt holes 13. As illustrated in FIG. 2, bolt 16 is inserted through each bolt hole 13. Vehicle body attachment portion 11 is fixed to a vehicle body frame (not illustrated) (for example, a side frame) by tightening each bolt 16.

As illustrated in FIG. 1, bottom surface fixing portion 12 includes one end connected to a lower end of vehicle body attachment portion 11 and the other end provided so as to protrude outward in the vehicle width direction. That is, bottom surface fixing portion 12 is provided perpendicular (including substantially perpendicular) to vehicle body attachment portion 11.

As illustrated in FIG. 1, bottom surface fixing portion 12 is provided with mounting portion 14 and a plurality of bolt holes 15.

As illustrated in FIG. 1, mounting portion 14 is provided so as to protrude upward from a surface provided with bolt holes 15. As illustrated in FIG. 2, when battery 200 is mounted on mounting portion 14, mounting portion 14 is inserted into a recessed portion provided in a bottom portion of battery 200.

As illustrated in FIG. 2, bolt 17 is inserted through each bolt hole 15. A bottom surface of battery 200 is fixed to bottom surface fixing portion 12 by tightening each bolt 17.

Note that, a bent portion that is a connection portion between vehicle body attachment portion 11 and bottom side fixing portion 12 may be provided with a reinforcement member for further ensuring strength.

Further, in the present embodiment, a description has been given with an example in which each of vehicle body attachment portion 11 and bottom surface fixing portion 12 has a hat-shaped cross section in the shorter side direction, but the present disclosure is not limited thereto.

Second bracket 20 is a bracket formed into an L-shape. Second bracket 20 includes upper surface fixing portion 21 and side surface fixing portion 22.

As illustrated in FIG. 1, upper surface fixing portion 21 includes one end connected to an upper end of vehicle body attachment portion 11 and the other end provided so as to protrude outward in the vehicle width direction. Upper surface fixing portion 21 is provided so as to face bottom surface fixing portion 12 across a space in which battery 200 is provided. Note that, the one end of upper surface fixing portion 21 may be connected to the vehicle body frame instead of the upper end of vehicle body attachment portion 11.

As illustrated in FIG. 1, side surface fixing portion 22 includes one end connected to the other end of upper surface fixing portion 21 and the other end provided to protrude downward in the vehicle height direction. That is, side surface fixing portion 22 is provided perpendicular (including substantially perpendicular) to upper surface fixing portion 21.

As illustrated in FIG. 1, side surface fixing portion 22 is provided with bolt hole 23. As illustrated in FIG. 2, bolt 25 is inserted through bolt hole 23. Side surface a of battery 200 is fixed to side surface fixing portion 22 by tightening bolt 25. In other words, side surface fixing portion 22 is fixed to side surface a of battery 200. Side surface a of battery 2 illustrated in FIG. 2 is, among side surfaces of battery 200, a side surface opposite to a side surface facing vehicle body attachment portion 11.

As described above, on-board article fixing bracket 1 of the present embodiment includes: first bracket 10 formed into an L shape; and second bracket 20. First bracket 10 includes: vehicle body attachment portion 11 fixed to the vehicle body frame; and bottom surface fixing portion 12 which is connected to the lower end of vehicle body attachment portion 11 and protrudes outward in the vehicle width direction, and to which the bottom surface of battery 2 is fixed. Second bracket 20 includes the one end connected to the upper end of vehicle body attachment portion 11, is provided so as to protrude outward in the vehicle width direction, and includes the other end fixed to battery 200.

Since this feature allows a side of an upper surface of battery 2 to be fixed, it is possible to reduce a load applied to the bent portion of the first bracket. Accordingly, on-board article fixing bracket 1 is capable of achieving an increase in strength.

Further, in the related art, there is known a technique of using a band to fix an on-board article mounted on an L-shaped bracket. In this case, however, the on-board article may be deformed (for example, crushed) by tightening the band. In particular, since a battery does not have a baffle structure such as a fuel tank, the battery is likely to be deformed, in a case where a band is used, by tightening the band. The present embodiment, on the other hand, uses second bracket 20 instead of a band and is therefore capable of preventing battery 200 from being deformed.

Note that, the present disclosure is not limited to the embodiment described above, but various modifications can be made without departing from the spirit thereof. Hereinafter, variations will be described.

[Variation 1]

In the embodiment, a description has been given with an example in which two on-board article fixing brackets 1 are used, but the present disclosure is not limited thereto. For example, three or more on-board article fixing brackets 1 may be used. Alternatively, for example, a plurality of on-board article fixing brackets 1 that has been integrally configured may be used.

[Variation 2]

In the embodiment, a description has been given with an example in which the on-board article is battery 200, but the present disclosure is not limited thereto and the on-board article may be other than battery 200, which is in particular effective when the on-board article is heavy and does not have a baffle structure.

[Variation 3]

In the embodiment, a description has been given with an example in which side surface fixing portion 22 of second bracket 20 and side surface a of battery 200 are bolted, but the present disclosure is not limited thereto.

For example, second bracket 20 may not include side surface fixing portion 22, but may include only upper surface fixing portion 21. In this case, for example, the other end of upper surface fixing portion 21 (the end portion opposite to the end portion connected to the upper end of first bracket 1) may be provided with a bolt hole, a bolt may be inserted through the bolt hole, and upper surface fixing portion 21 (in other words, second bracket 20) may be fixed to the upper surface of battery 200 by bolting.

[Variation 4]

In the embodiment, a description has been given with an example in which the components of on-board article fixing bracket 1 are first bracket 10 and second bracket 20, but the present disclosure is not limited thereto. For example, on-board article fixing bracket 1 may mean only second bracket 20 (that is, on-board article fixing bracket 1=second bracket 20 may be configured).

The variations have been described thus far. The variations described above may also be implemented in combination as appropriate.

This application is based on Japanese Patent Application No. 2020-165203, filed on Sep. 30, 2020, the contents of which are incorporated herein by reference.

INDUSTRIAL APPLICABILITY

The on-board article fixing bracket of the present disclosure is useful for fixing an on-board article.

REFERENCE SIGNS LIST

1 On-board article fixing bracket
10 First bracket
11 Vehicle body attachment portion
12 Bottom surface fixing portion
13, 15, 23 Bolt hole
14 Mounting portion
16, 17, 24, 25 Bolt
20 Second bracket
21 Upper surface fixing portion
22 Side surface fixing portion

The invention claimed is:
1. An on-board article fixing bracket, comprising:
a first bracket formed into an L shape, the first bracket including:
a vehicle body attachment portion fixed to a vehicle body frame; and
a bottom surface fixing portion which is connected to a lower end of the vehicle body attachment portion and protrudes outward in a vehicle width direction, and to which a bottom surface of an on-board article is fixed, and a second bracket that includes one end connected to an upper end of the vehicle body attachment portion, is provided so as to protrude outward in the vehicle width direction, and includes another end fixed to the on-board article, wherein the second bracket includes an upper surface fixing portion and a side surface fixing portion, wherein the upper surface fixing portion is provided so as to face the bottom surface fixing portion across a space in which the on-board article is provided, and the side surface fixing portion is fixed to a side surface of the on-board article.

2. The on-board article fixing bracket according to claim 1, wherein the other end of the second bracket is fixed to an upper surface of the on-board article.

3. The on-board article fixing bracket according to claim 1, wherein the other end of the second bracket is fixed to, among side surfaces of the on-board article, a side surface opposite to a side surface facing the vehicle body attachment portion.

4. The on-board article fixing bracket according to claim 1, wherein the other end of the second bracket is fixed to the on-board article by bolting.

5. The on-board article fixing bracket according to claim 1, wherein the on-board article is a battery.

6. The on-board article fixing bracket according to claim 1, wherein the side surface fixing portion is fixed to the side surface of the on-board article by a tightening bolt.

7. The on-board article fixing bracket according to claim 1, wherein the side surface fixing portion is provided so as to hold the on-board article with the vehicle body attachment portion in the vehicle width direction.

\* \* \* \* \*